United States Patent Office 2,908,178
Patented Oct. 13, 1959

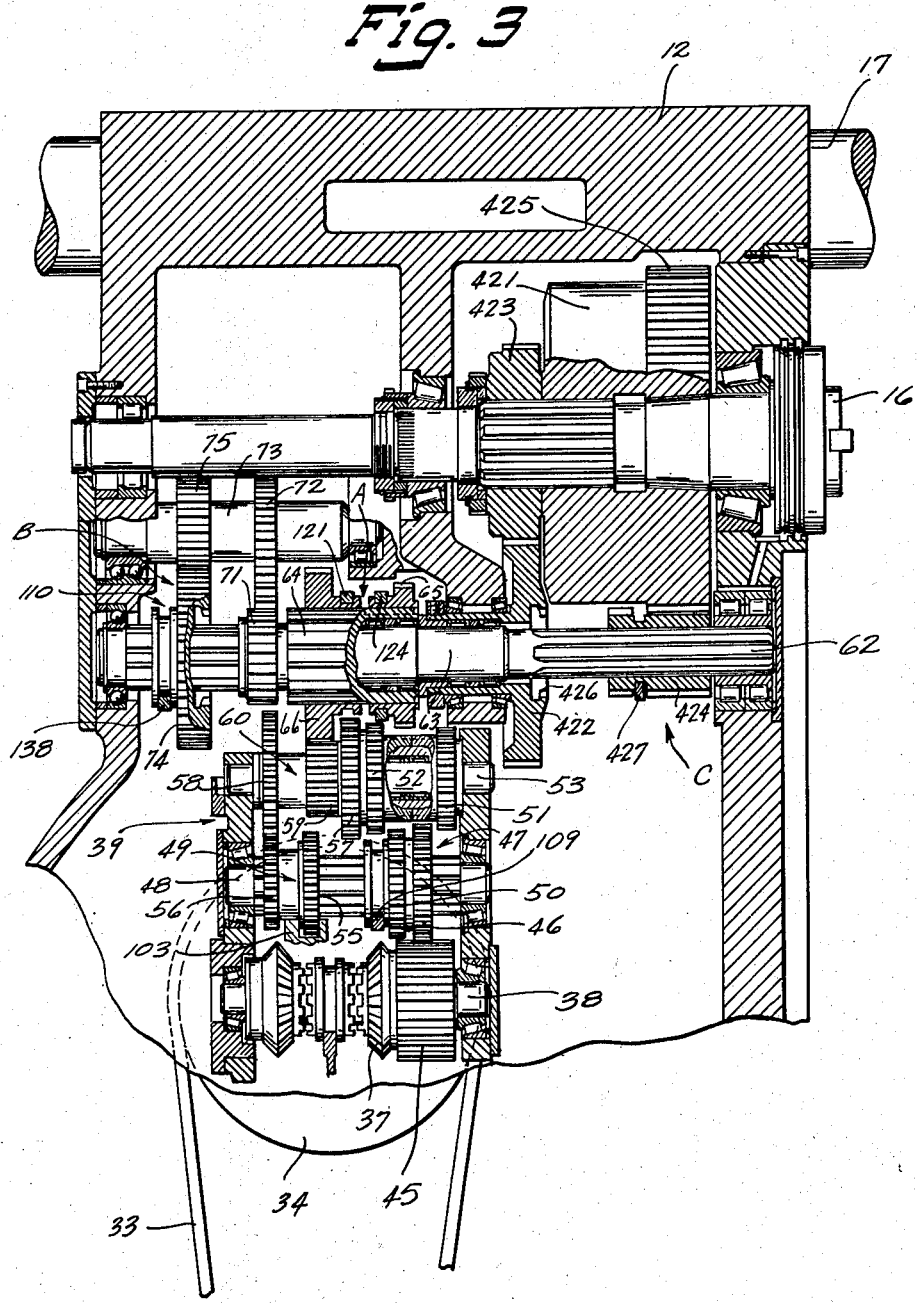

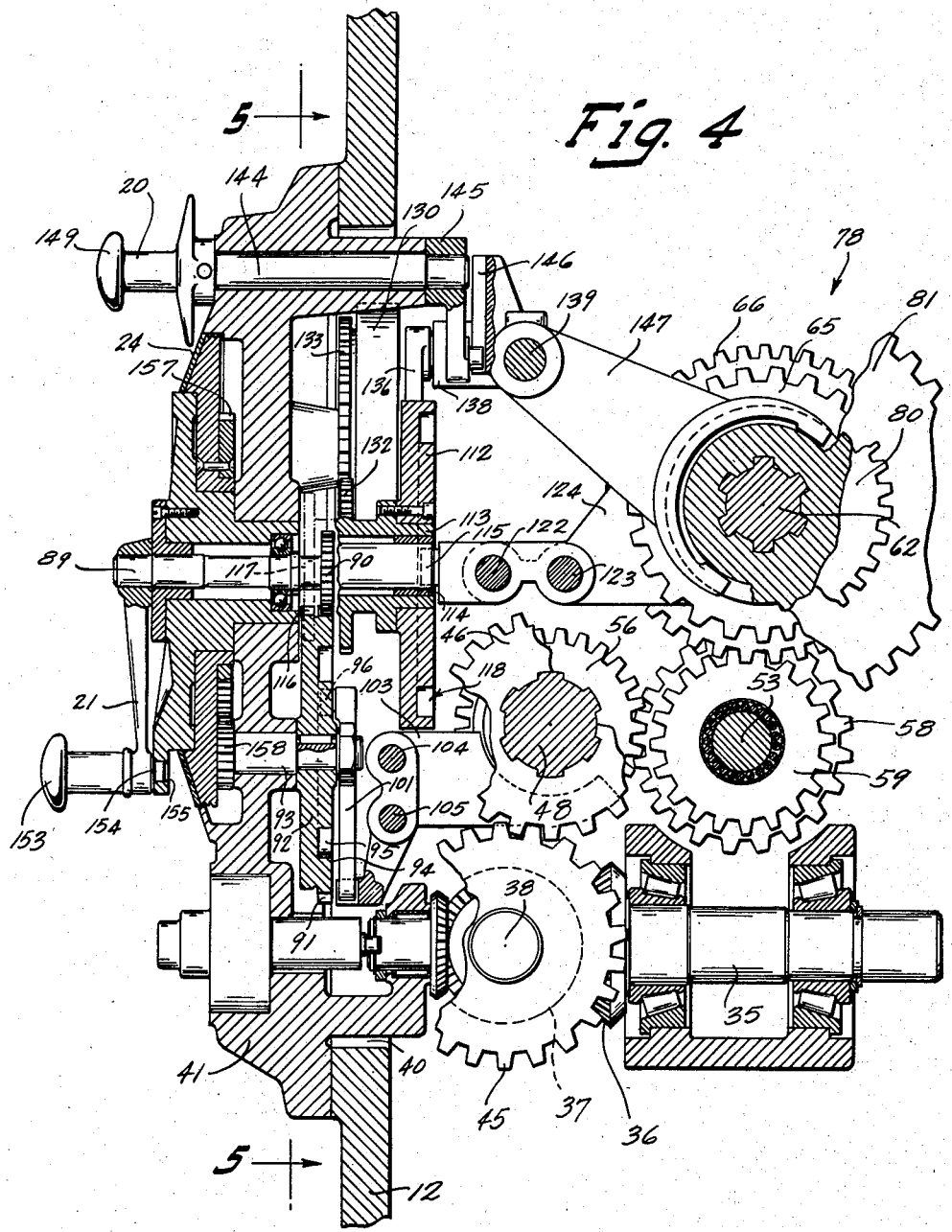

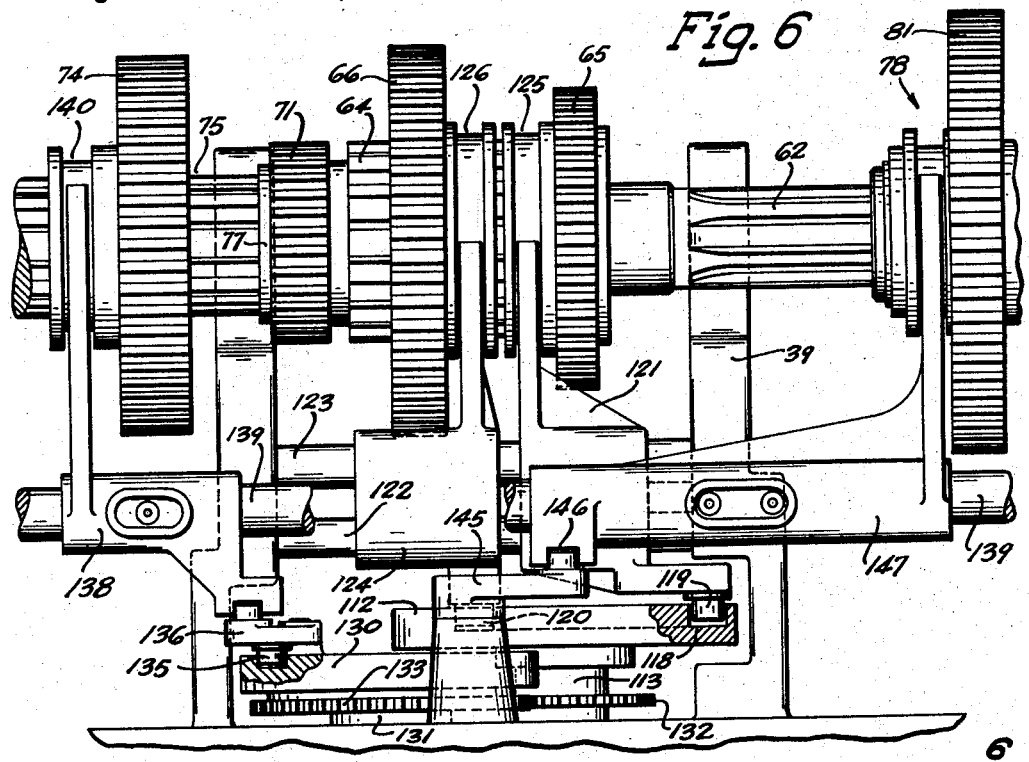

2,908,178

MACHINE TOOL TRANSMISSION MECHANISM

Joseph B. Armitage, Milwaukee, and James N. Flannery, West Allis, Wis., assignors to Kearney & Trecker Corporation, West Allis, Wis., a corporation of Wisconsin Original application January 19, 1950, Serial No. 139,342, now Patent No. 2,736,243, dated February 28, 1956. Divided and this application June 13, 1955, Serial No. 515,177

11 Claims. (Cl. 74—333)

This application is a division of our copending United States patent application, Serial No. 139,342, filed January 19, 1950, now Patent No. 2,736,243.

This invention relates generally to improvements in machine tools and more particularly to an improved transmission mechanism for driving the tool spindle of a milling machine.

A general object of the invention is to provide improvements in the construction of a milling machine power transmission and control mechanism of a character resulting in greater efficiency in operating the machine and in obtaining a wider than usual range of machining capacity.

Another object is to provide an improved speed changing transmission mechanism for a milling machine adapted to transmit full torque at high output speeds while being adjustable to transmit only low torque at low output speeds.

Another object is to provide a milling machine of improved construction having a tool spindle disposed to be driven at a wider than usual range of output speeds.

A still further object is to provide an improved power transmission system for a machine tool, including a pair of range change mechanisms connected in series relationship and arranged to be driven by a fixed step speed changer, the mechanisms being so proportioned as to provide for continuous speed changes throughout their full range of operation and one of the range change mechanisms being operable to provide an extremely low series of output speeds.

According to this invention, a machine tool such as a milling machine, is provided with a high powered motor operatively connected to drive a tool spindle with relatively high torque at high rates of speeds for faster removal of metal from a workpiece. A cooperating work supporting member is disposed to be selectively driven along three mutually transverse lines of movement by means of a separate work feeding motor that is electrically interconnected with the spindle driving motor. To drive the tool spindle at any selected speed within a wider than usual range of operating speeds, an improved variable speed transmission mechanism is operatively interposed between the spindle driving motor and the tool spindle.

The foregoing and other objects of the invention which will become more fully apparent from the following detailed description of apparatus exemplifying the invention may be achieved by the milling machine described herein as a preferred embodiment thereof in connection with the accompanying drawings, in which:

Fig. 3 is a vertical longitudinal sectional view through the upper part of the machine, showing a modified form of spindle driving transmission mechanism;

Fig. 4 is an enlarged fragmentary vertical transverse sectional view through the upper part of the machine, showing the speed controlling apparatus for the spindle driving transmission mechanism;

Fig. 5 is a vertical longitudinal sectional view taken on the line 5—5 of Fig. 4 and showing a portion of the speed controlling apparatus; and, Fig. 6 is a horizontal sectional view taken on the line 6—6 of Fig. 5 and showing a portion of the speed controlling and power transmitting mechanisms.

Figure 1:
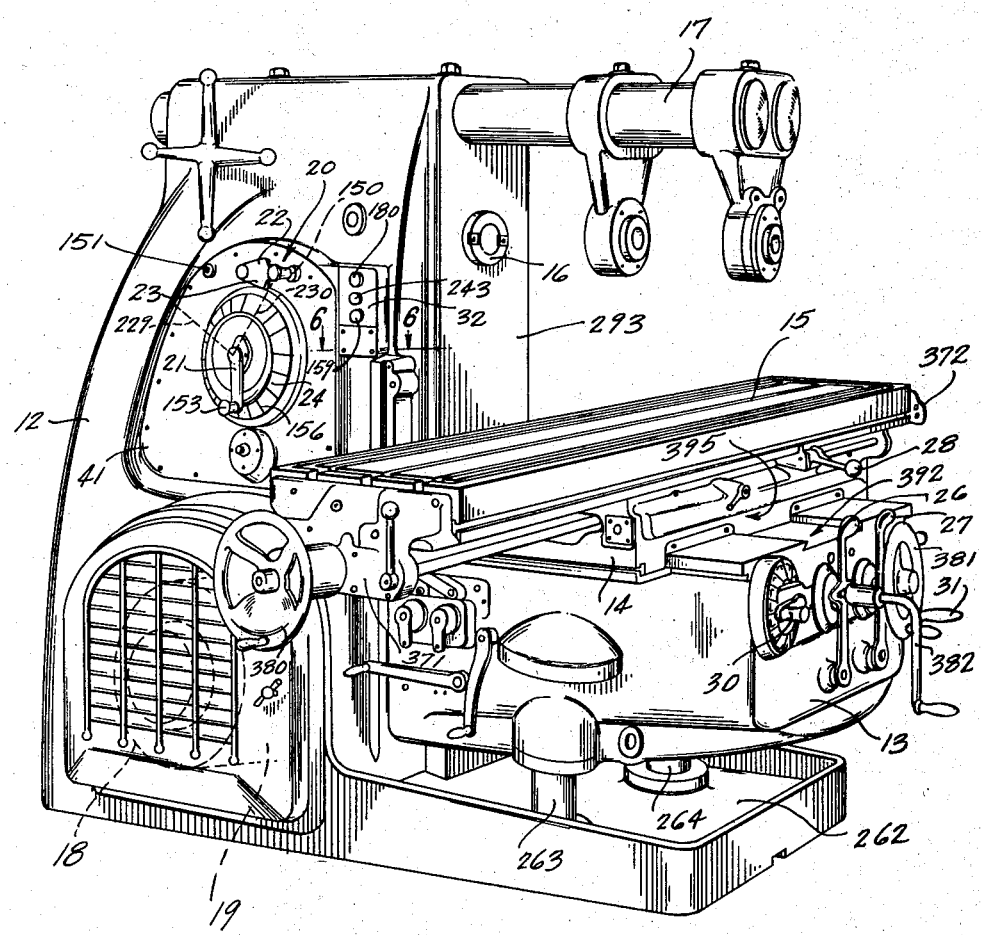
Figure 1 is a view in perspective depicting the left side of a milling machine of the knee and column type incorporating a preferred form of the invention.

Referring more particularly to the drawings and especially to Fig. 1 thereof, the machine tool there shown as an example of apparatus constituting a preferred embodiment of the invention, is a milling machine of the well known horizontal spindle type generally similar in overall structure to the machine more fully shown and described in United States Patent No. 2,497,842, which issued on February 14, 1950. As shown in Fig. 1 of the drawings, the milling machine structure comprises essentially an upstanding column 12 which serves to carry on its face a knee 13, saddle 14, and work supporting table 15 superimposed for selectively slidable movement in a plurality of mutually transverse planes. Near the top of the column 12 there is journalled the usual horizontally disposed tool supporting spindle 16 and above it are slidably mounted overarms 17 for supporting a cutter arbor (not shown) that may be mounted in the spindle 16 in well known manner to carry a cutter in cooperating relationship with a workpiece on the work supporting table 15.

Power for rotating the tool spindle 16 is derived from a relatively high powered motor 18 that is mounted in a motor compartment 19 formed within and extending transversely of the lower part of the column 12. The speed at which the spindle 16 is operated may be adjusted by means of a range change lever 20 and a speed selecting lever or crank 21 mounted on the left side of the column 12, the levers functioning cooperatively to shift speed changing gearing mounted within the column 12, directly above but separated from the motor compartment 19. The spindle speed is indicated by the coordinated positioning of a pair of range change indicating plates 22 and 23 associated with the range change lever 20, in cooperation with a speed indicating dial 24 that is connected to be turned by the crank 21.

As fully explained in the aforementioned parent patent application, Serial No. 139,342, now Patent No. 2,736,243, power for effecting movement of the vertically slidable knee 13, the transversely slidable saddle 14 and the longitudinally slidable table 15 is derived from a separate feed motor (not shown) mounted on the rightward side of the knee 13 and arranged to be operated coordinately with the relatively high powered spindle driving motor 18. In order to effect selective directional movement of the knee 13, saddle 14, and table 15, there are provided at the front of the machine, as shown in Fig. 1, directional shifting levers 26, 27 and 28 operatively connected to actuate reversing clutch mechanisms for transmitting power to drive the respectively movable members. To minimize lateral deflection of the knee 13 and provide maximum rigidity for the work supporting table 15 during a cutting operation, there is provided an improved elevating mechanism for the knee, and which is arranged to be actuated under control of the directional shifter lever 26. For effecting selective feeding movement of the work supporting table 15 relative to the cutter spindle 16, there is provided on the front of the knee a feed rate selecting lever 30 connected to shiftably adjust a variable speed feed transmission contained in a gear compartment formed within the base 13. In order to effect movement of the knee 13, saddle 14 or table 15 at a fast or rapid traverse rate of speed, a rapid traverse lever 31 is connected to effect energization of the feed motor 25 and simultaneously therewith to actuate a clutching mechanism (not shown) to effect transmission of power to drive each of the reversing mechanisms respectively engageable on movement of the feed directional levers 26, 27 and 28.

For effecting coordinated energization of the spindle driving motor 18 and the feed motor (not shown), a control station 32 mounted on the left side of the column is provided with controlling means for coordinately starting or stopping the spindle motor 18 and the feed motor, as well as inching control means arranged to effect a momentary energization of the spindle driving motor, as fully explained in the aforementioned parent patent application, now Patent No. 2,736,243.

Figure 2:
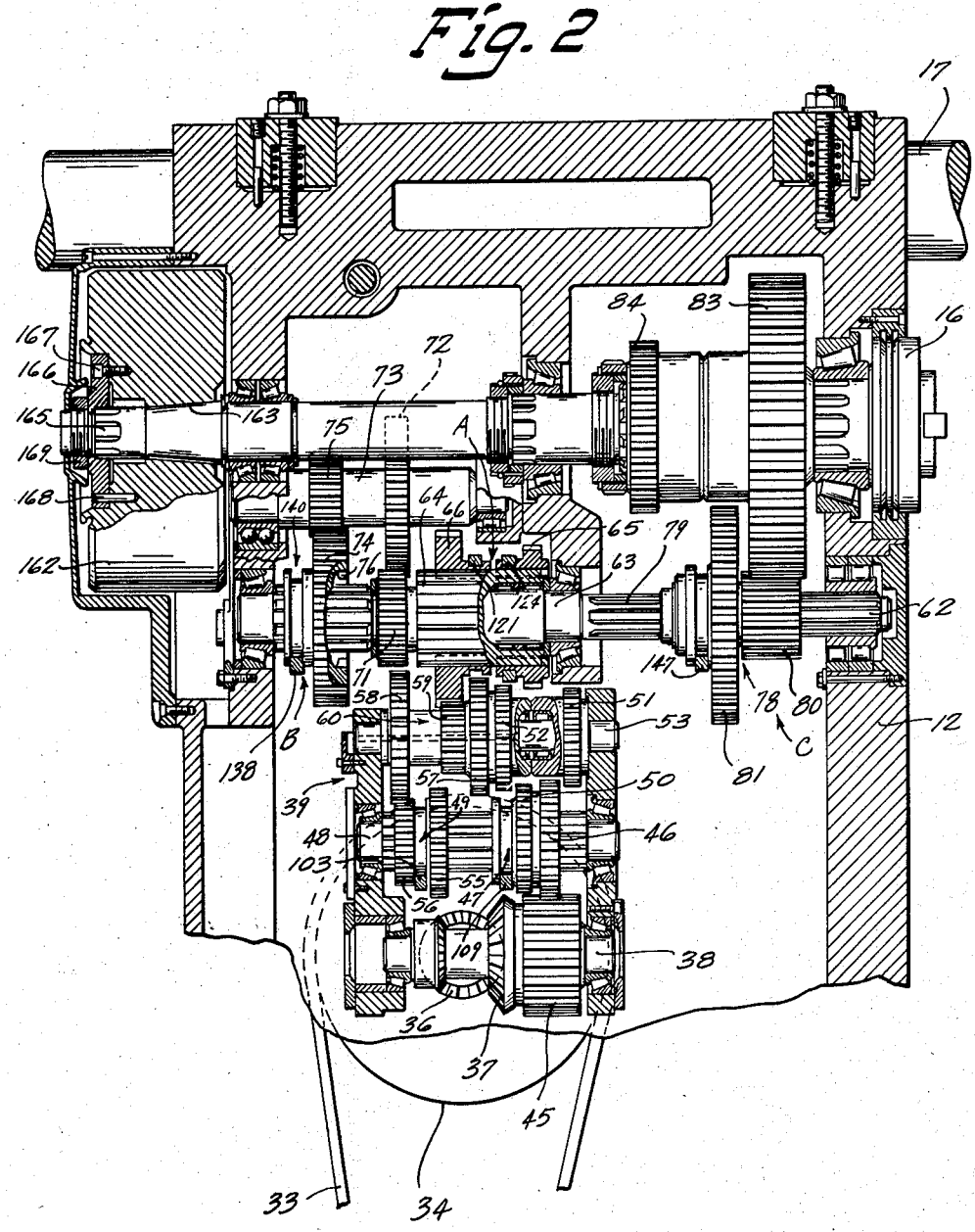
Fig. 2 is a vertical longitudinal sectional view through the upper pare of the machine, showing the spindle driving transmission mechanism.

Referring now to Figs. 2 and 4 of the drawings, power for rotating the spindle 16 is transmitted from the main drive motor 18 in the motor compartment 19 by means of multiple V-belts 33 that pass over a pulley 34. The pulley 34, in turn, is journalled to rotate on the side of the machine column and is connected to transmit power to a shaft 35 which extends into the column and has integrally formed with it a driving bevel gear 36. The driving bevel gear 36 transmits driving power to a meshing driven bevel gear 37 which is journalled to rotate on one end of a shaft 38.

The shaft 38 is rotatably journalled in a speed box 39 which extends within a gear compartment 40 above the motor compartment in the column through an opening in the left side thereof. As shown in Fig. 1, a cover plate or control panel 41 supports the speed box 39 within the column opening and carries the range change lever 20 and the speed selecting crank 21, as well as the range change indicating plates 22 and 23 and the speed indicating dial 24 respectively associated therewith for indicating the selected driving speed of the spindle 16.

Referring again to Fig. 2, the driven bevel gear 37 is integrally formed with an elongated spur pinion 45 which meshes with one gear 46 of a couplet 47 that is slidably mounted for selective longitudinal movement on a short splined shaft 48 parallelly journalled in the speed box 39. The splined shaft 48, together with the gear couplet 47 and a second gear couplet 49 slidably carried by the shaft for longitudinal shifting movement, constitute elements of a speed changing device A forming one part of the speed changing transmission mechanism. The couplet 47 comprises the gear 46 and a gear 50 joined together and disposed to be selectively meshed alternatively with cooperating idler gears 51 and 52, respectively, rotatably journalled on an idler shaft 53 that is fixedly mounted within the speed box 39 above and parallel to the rotatably journalled splined shaft 48. The second couplet 49 slidably mounted on the splined shaft 48, comprises a gear 55 and a gear 56 joined together and disposed to be selectively meshed alternatively with a gear 57 and a gear 58, respectively, also journalled on the shaft 53. The four idler gears 51, 52, 57, and 58 together with a gear 59 journalled on the stationary shaft 53, are secured together in manner to rotate as one unitary intermediate idler cluster 60 of the speed changing device A. The two couplets on the shaft 48 constituting the primary element of the speed changing device A may be shifted to engage each of the four gears in turn with its complementary idler gear on the shaft 53 to drive all of the idler gears constituting the idler cluster 60 at any one of four different rates of speed.

Above the stationary shaft 53 and disposed parallel to it is a longer shaft 62 that is journalled directly in the column 12 and that in turn has rotatably journalled on its central portion 63 an externally splined sleeve 64. Slidably mounted on the splined sleeve 64 are shiftable gears 65 and 66 which are selectively slidable to mesh with the idler gears 52 and 59, respectively, which form parts of the intermediate idler cluster 60. The sliding gears 65 and 66 constitute a secondary element of the speed changing mechanism A and may be selectively positioned to transmit driving power from the intermediate idler cluster 60 to the splined sleeve 64 at either of two speed ratios.

Since the primary element of the variable speed device A constituted by the couplets 47 and 49 is capable of four different speed rates and the secondary element constituted by the gears 65 and 66 is capable of two speed rates, it is evident that the splined sleeve 64 may be driven at any one of eight speeds, by suitably engaging different ones of the sliding gears in the primary and secondary elements with their cooperating idler gears constituting the intermediate speed transmitting idler cluster 60. As indicated in Fig. 2, the gears are shown in position to drive the splined sleeve 64 at the lowest speed rate of the eight speeds available through the speed changing device A with the large gear 66 of the secondary element engaging the small idler gear 59 and the small gear 56 of the primary element engaging the large idler gear 58. As will hereinafter be more fully explained, the speed selecting crank 21 and the indicating dial 24 are movable to a plurality of positions providing for an operating condition within the speed changing transmission device A in which a selected one of the gears of the primary element and a selected gear of the secondary element are in mesh with cooperating gears of the intermediate idler cluster 60 rotatably journalled on the shaft 53.

From the externally splined sleeve 64 rotatably journalled on the shaft 62, power is transmitted through an intermediate range changing mechanism B to drive the rotatably journalled shaft 62 in a selected one of two speed rate series. Power is then transmitted from the shaft 62 through a final range changing mechanism C which functions to deliver power to the tool spindle 16 in a high or a low operating range alternatively. The intermediate range changer B and the range changer C are positionable in a plurality of shiftably adjusted positions and are so proportioned as to provide three distinct operating ranges including a low, intermediate and high range in such a manner that the full compass of the speed changing device A may be utilized in each of the three ranges without overlapping or discontinuity between the ranges.

A gear 71 rotatably journalled on the central portion of the shaft 62 is secured to the splined sleeve 64 in manner to transmit driving power therefrom to a meshing gear 72 secured to a jack shaft 73 rotatably journalled in the column 12 in parallel relationship with the shaft 62 and constituting an element of the intermediate range changing mechanism B. The primary element of the intermediate range changing mechanism is constituted by a gear 74 which is slidably mounted on a splined rearward portion of the shaft 62 for selective longitudinal shifting movement thereon. As shown in Fig. 2, the gear 74 has been shiftably positioned to engage a complementary gear 75 secured to the jack shaft 73 in a manner to transmit driving power from the gear 71, through the gear 72 and the jack shaft 73 to drive the spindle driving shaft 62 in an extremely low range of speeds. With this condition existing, it will be apparent that the shaft 62 is connected to be rotatably driven at a much lower rate of speed than the sleeve 64 and gear 71 which are rotatably journalled in the central portion of the shaft. For driving the shaft 62 in a higher speed range, the gear 74 may be moved rightwardly in manner that an internal gear 76 formed therein directly engages the teeth of the gear 71 in the manner of a clutch.

From the shaft 62, power is transmitted through a couplet 78 slidably splined on the rightward end 79 of the shaft 62 and constituting the final range changing mechanism C which is arranged to drive the tool spindle 16 in a high or a low range of operating speeds. The couplet 78 comprises a small gear 80 and a large gear 81 joined together and mounted for longitudinal sliding movement on the shaft 62 into meshing engagement alternatively with a low range driving gear 83 or a high range driving gear 84, respectively, which are splined directly to the spindle 16.

As hereinbefore mentioned, the gears of the intermediate range changer B and the range changer C are positionable in a plurality of positions for transmitting driving power from the splined sleeve 64 to rotate the spindle 16 at any one of three distinct speed ranges including a low, intermediate and a high range. To drive the spindle 16 through the lowest range of operating speeds, the range changers B and C are positioned as shown in Fig. 2, with the gear 74 engaging its complementary driving gear 75 and the gear 80 of the couplet 78 engaging its complementary low range spindle driving gear 83. For driving the spindle 16 through an intermediate range of speeds, the gear 80 of the couplet 78 is retained in meshing engagement with the low range spindle drive gear 83 and the gear 74 is shifted rightwardly in manner that the internal gear 76 formed therein engages the complementary gear 71 thereby locking the sleeve 64 to the shaft 62. Thus, in the low and intermediate ranges constituting the lowest sixteen speeds, driving power is transmitted from the small spindle driving gear 80 to the large spindle driving gear 83. To drive the spindle 16 at the high range of operating speeds, the gear 74 is retained in its rightwardly shifted position in clutching engagement with the driving gear 71 and the couplet 78 is shifted leftwardly in manner that the gear 81 is in meshing engagement with the high range spindle driving gear 84. The large gear 83 has the effect of a flywheel and tends to reduce to a minimum minor fluctuations in cutter speed which might occur as the individual teeth of a cutter engage a workpiece. During the intermediate and high ranges of output speed, the internal gear 76 is retained in engagement with the gear 71 for driving the shaft 62 at the same speed as the sleeve 64.

The speed changing device A functions to provide a series of eight different driving ratios in step by step arrangement within each of the three distinct speed ranges effected by the combined positioning of the range changers B and C and including a low, intermediate and high speed range so proportioned as to provide progressive steps without overlapping or discontinuity between the ranges. By this combination of the speed changing device A with the intermediate speed range changer B and the range changer C, it is possible to predeterminately position the shiftable gearing contained therein for operating the tool spindle 16 at any one of twenty-four speeds arranged in approximate geometrical progression.

A principal advantage of the improved variable speed transmission mechanism illustrated in Fig. 2, is the provision of a wider than usual range of output speeds effected by arranging the transmission to have a graduated power transmitting capacity in a manner to transmit the full power of a relatively high powered spindle driving motor at the higher rates of speed. Generally, in variable speed transmissions of the shiftable gear type, there is a definite limitation in the overall range of allowable output speeds, particularly when a relatively high powered constant speed motor is utilized as a source of power. Included among the main factors determining the upper and lower limits of the allowable range of output speeds are the input power of the driving motor, as well as the space allowable for a transmission disposed to be selectively adjustable for transmitting as many output speeds as possible within a selected range. As is well known in the art, an inherent characteristic of any shiftably geared transmission is the wide variation in torque exerted through the various gears and shafts comprising the transmission as the transmission is adjusted to drive the tool spindle at different rates of speed.

Assuming that the full power of a constant speed motor is applied to drive a shiftably geared transmission, the torque on the various gears and shafts thereof will be increased as the transmission is adjusted downwardly to drive a tool spindle at lower rates of speed. Conversely, as the transmission is adjusted upwardly to drive a tool spindle at higher rates of speeds, the torque on the various movable members thereof will be decreased.

Until recent years, when improvements in cutting tools necessitated a considerable increase in spindle driving power, the power required to rotate a cutter spindle for removing metal from a workpiece with maximum efficiency has been considerably less than is now required in utilizing the improved methods of performing a cutting or machining operation. Thus, with the lesser requirements of spindle driving power in prior types of machine tools, the variations in torque effected as a shiftably geared spindle driving transmission was adjusted through a complete range of driving speeds imposed no serious load conditions tending to exceed the power transmitting capacity of the transmission. In a milling machine of a specified size therefore, the transmission mechanism could be so arranged as to provide as wide a range of spindle driving speeds as necessary while transmitting the full power of the spindle driving motor for driving the cutter spindle with maximum efficiency in performing a cutting operation on a workpiece suited to the size and capacity of that particular machine.

With the advent of improved techniques in the utilization of milling machine cutters and the attendant increase in the rate at which metal could be removed from a workpiece, however, the variations in torque on the various rotatable members of a variable speed transmission mechanism imposed a serious restriction on the allowable range of spindle driving speeds. With the available input driving power for the cutter spindle trebled or quadrupled, for example, to more fully utilize the improved methods of removing metal from a workpiece, it was necessary to strengthen the various rotatable members of a shiftably geared spindle driving transmission mechanism to effectively transmit the full power of the driving motor through a selected range of speeds. The overall range of output speeds however, was necessarily restricted and did not provide for an extremely low series of spindle driving speeds because of the excessive torque developed, in the event the full capacity of the higher powered motor were applied. Inasmuch as a milling machine is usually so proportioned as to accommodate a range or class of work within the power capacity of the motor when the spindle is driven at the higher rates of speeds, there are structural and economic limitations preventing the construction of a variable speed transmission having sufficient capacity to transmit the full power from a relatively high powered motor at extremely low rates of speed.

A primary advantage of this invention is the provision of a compactly arranged variable speed transmission having operating characteristics that provide for transmitting the full power of the relatively high powered driving motor to drive the tool spindle with a higher degree of torque than has heretofore been practicable, for faster removal of metal at the high speed rates. In addition to this, the transmission is so arranged as to be selectively adjustable through a wide range of spindle driving speeds extending downwardly through a series of extremely low operating speeds in manner to increase the operational flexibility of the machine for performing the largest possible variety of cutting operations. The transmission is necessarily limited in its power transmitting capacity at the lowest output speeds because of the before-mentioned limitations imposed by the overall size and capacity of the machine, the extremely high powered spindle driving motor and the variations in torque on the various rotatable members of any shiftably geared transmission which occur as the output speed thereof is selectively adjusted through its complete range of allowable speeds. In normal machine operation however, this reduced power transmitting capacity of the variable speed transmission at the lowest output speeds is still fully adequate to drive the cutter spindle for performing cutting operations on a class of work within the range of the machine.

Referring again to Fig. 2, the improved variable speed transmission mechanism there shown, is arranged to have sufficient torque transmitting capacity to transmit the full power of the relatively high-powered spindle driving motor 18 whenever the transmission is adjusted to drive the tool spindle 16 at a selected speed in either the high, the intermediate or portions of the low speed range. When the transmission is adjusted to drive the spindle 16 within the lowest range of operating speeds however, it will be apparent that the mechanical advantage effected by engaging the intermediate range change gear 74 with the low speed driving gear 75 will greatly increase the torque on the low speed driving gear 80 and its meshing spindle gear 83 if the full power of the motor were applied at the lowest driving speeds. With the gear 74 engaging the gear 75 to drive the spindle 16 through the lowest operating range, the greatest mechanical advantage, and, consequently, the highest torque on the spindle driving gears would occur during the lowest of the eight stepped driving ratios obtainable by selectively shifting the gearing in the speed changing device A. As a result of the increased mechanical advantage on the spindle driving gears 80 and 83, the power transmitting capacity of the entire variable speed transmission mechanism is reduced in the lowest of the eight stepped speed ratios available in the low range.

Although the transmission mechanism shown in Fig. 2 is of the variable torque transmitting type, a principal advantage of the invention is the novel arrangement for providing an extremely wide range of output speeds.

To protect the transmission mechanism against varying degrees of torque within the range of its torque transmitting capacity, there is provided a preferred form of adjustable torque limiting control, as fully described in the aforementioned Patent No. 2,736,243.

The control mechanism for shifting the various sliding gear couplets and gears to effect the changes in the spindle driving ratio is similar to that disclosed in U.S. Patent No. 2,240,973, dated May 6, 1941. This mechanism includes a cam actuated gear shifting apparatus constituting a mechanical linkage arranged to be directly operated by the speed selecting crank 21 and functioning to positively shift the sliding gears of the variable speed device A in such a manner that the eight speeds of the series may be effected in predetermined order. One complete revolution of the crank 21 is required for each gear shifting movement of the speed changing device A or a total of eight revolutions of the crank are required to effect a complete transit of the eight stepped driving ratios available therethrough. In order to obtain the complete series of twenty-four spindle driving speeds available with the combined coordinated positioning of the speed changing device A and the range changers B and C, a total of twenty-four revolutions of the crank 21 are required. Coordinately with the three repetitive series of shifting movements of the speed changing device A, the crank 21 is operatively connected to effect a coordinated shifting movement of the intermediate range changing mechanism B. The shifting mechanism operative on movement of the crank 21, is so arranged that the gears are shifted in a manner to avoid possibility of locking the mechanism by engaging more than one gear on the primary shaft 48 or more than one gear on the secondary element 64 with a cooperating gear of the idler cluster 60, and in a manner that the intermediate range change gear 74 is in its low range driving position during the first of the three repetitive series of shifting movements of the speed changer A, while for the last two series of shifting movements of the speed changer A, the gear 74 is retained in engagement with the gear 71 for its high range driving position.

As shown in Fig. 4, the speed selecting lever or crank 21 is fixed on the outer end of a shaft 89 that is journalled in the control panel 41 concentric with the speed indicating dial 24 and is provided at its inner end with a pinion 90. The pinion 90, in turn, meshes with a gear 91 formed on the periphery of a primary speed changing cam 92 fixed on a stub shaft 93 which is journalled in the control panel 41. As shown in Figs. 4 and 5, the cam 92 is provided on its inner face 94 with a cam track 95 disposed to cooperate with diametrically disposed cam followers 96 and 97, respectively.

The cam follower 96 is carried by one end of a shifting arm 101 that is journalled by means of a forked portion 102 on the inner side of the control panel 41 and that is engaged at its other end with a shifting fork 103 slidably mounted on guide rods 104 and 105 carried by the speed box 39. As shown in Figs. 2 and 4, the shifting fork 103 extends between the gears 55 and 56 of the couplet 49 in the primary shifting element and is operative on movement of the shifting arm 101 by the cam groove 95 acting upon the cam follower 96 to shift the gear 55 or the gear 56 into meshing engagement with the respectively cooperating gears 57 or 58 of the idler cluster 60.

The cam follower 97 is carried on one arm of a bell crank shifting lever 106 journalled by means of a forked arm 107 on the inside of the control panel 41 and that engages with the end of its other arm 108 a shifting fork 109 also slidably mounted on the guide rods 104 and 105, as shown in Figs. 4 and 5. The shifting fork 109 is generally similar to the fork 103 and is engaged in an annular groove formed in the hub of the couplet 47 in the primary element for shifting the gears 46 or 50 into engagement with the gear 51 or the gear 52, respectively of the idler cluster 60. As shown in Fig. 5, the cam groove 95 is provided with a semicircular section which functions to retain one of the couplets in neutral position while the other couplet is being shifted one way or the other by the remaining nonconcentric portion of the cam groove, thereby avoiding engagement of both couplets with the idler cluster at the same time.

For shifting the gears slidably mounted on the splined sleeve 64 constituting the secondary element of the variable speed device A, there is provided a secondary cam 112 secured to a sleeve 113, Fig. 4, journalled by means of a bearing 114 on a stub shaft 115 secured to the inner side of the control panel 41 directly above and parallel with the shaft 93. The secondary cam plate 112 is operatively connected with the primary cam plate 92 by means of intermittent gearing constituting a Geneva movement arranged in such a manner that the cam plate 112 is turned through one-half of a revolution at the end of each complete revolution of the primary cam plate 92. As shown in Figs. 4 and 5, the cam plate 92 is provided on its periphery, besides but spaced from the gear 91, with a discontinuous gear element 116, the teeth of which mesh with a mutilated gear 117 secured on the outer end of the sleeve 113 and cooperating in a manner to effect the desired intermittent movement of the cam 112 secured thereto.

As shown in Figs. 5 and 6, the secondary cam plate 112 is provided in the inward face thereof with a cam track 118 that is engaged by cam followers 119 and 120. The cam follower 119 is secured to a shifting fork 121 that is slidably mounted for longitudinal shifting movement on parallelly spaced guide rods 122 and 123 carried by the speed box 39. In a similar manner, the cam follower 120 is secured to shifting fork 124 which is also slidably mounted on the guide rods 122 and 123 for longitudinal shifting movement. The forward ends of the shifting forks 121 and 124 are disposed to engage annular grooves 125 and 126 formed on the hubs of the gears 65 and 66 of the secondary element for respectively shifting the gears into engagement with the cooperating gears 52 and 59 of the idler cluster 60.

The gearing interconnecting the speed selecting crank 21 with the cam plates 92 and 112 is so proportioned that for each revolution of the crank, one of the gears of the variable speed device A is shifted to effect a change from one speed to the next. Therefore, eight revolutions of the crank 21 are required to effect all of the eight combinations of gearing available and which result from coordinately rotating the primary cam plate 92 through two complete revolutions and the secondary cam plate 112 through one revolution.

For shifting the gear 74 of the intermediate range changer B in coordinated relationship with the shiftable gearing of the speed changing device A, Fig. 5, there is provided a tertiary cam plate 130 rotatably journalled on a stub shaft 131 secured to the inner side of the cover plate 41 in parallel relationship to the stub shafts 93 and 115. The cam plate 130 is also operatively connected with the primary cam plate 92 by means of intermittent gearing constituting a Geneva movement arranged in such a manner that the cam plate 130 is rotated through one-third of a revolution at the end of each two full revolutions of the primary cam plate 92. As shown in Figs. 4 and 5, the secondary cam drive sleeve 113 carries a discontinuous gear element 132, the teeth of which mesh with a mutilated gear 133 carried by the tertiary cam plate 130 and cooperating in manner to effect the desired intermittent movement thereof.

The tertiary cam plate 130 is provided in the inner face thereof, with a cam track 134 that is engaged by a cam follower 135. The cam follower 135 is secured to a shifting arm 136 which has one end journalled on a stub shaft 137 secured to the inner side of the control panel 41. The opposite end of the shifting arm 136 is arranged to engage a shifting fork 138 slidably mounted for longitudinal shifting movement on a guide rod 139 carried by the speed box 39. The forward end of the shifting fork 138 is disposed to engage an annular groove 140 formed on the hub of the gear 74 for effecting leftward movement of the gear 74 into meshing engagement with the cooperating driving gear 75, or for effecting rightward movement of the gear 74 in manner that the internal gear 76 formed therein is in engagement with the gear 71.

As hereinbefore indicated, eight revolutions of the crank 21 are necessary to position the shiftable gearing in the speed changing device A for obtaining the eight stepped speed ratios available therethrough. A total of twenty-four revolutions of the crank are required to obtain the three repetitive series of shifting movements of the gearing contained within the speed changing device A in order to obtain the complete series of twenty-four speed ratios available with a coordinated positioning of the speed changing device A, together with the range change changing mechanisms B and C.

In order to effect a coordinated positioning of the range changer B with a selected positioning of the speed changing device A, the gearing interconnecting the crank 21 with the cam plate 130 is so proportioned that for twenty-four revolutions of the crank 21, the cam plate 130 is rotated through one complete revolution.

For the first eight revolutions of the crank, coinciding with one series of eight shifting movements of the speed changing device A, the cam plate 130 is rotated through one-third of a revolution during which time the gear 74 is in engagement with the gear 75. At the completion of eight revolutions of the crank 21, the cam track 134 of the tertiary cam 130 and its cooperating follower 135 operate to move the arm 136 rightwardly in a manner that the internal gear 76 formed in the gear 74 is shifted rightwardly into engagement with the complementary gear 71. The cam track 134 is so formed that the internal gear 76 is retained in engagement with the gear 71 during the last sixteen revolutions of the crank 21. During this time, the cam plate 130 is rotated through two thirds of a revolution and the gearing in the speed changing device A is adjusted through two complete series of shifting movements.

In order to effect shiftable adjustment of the range changing mechanism C, there is provided the independently movable range change lever 20 secured to a shaft 144 journalled in the control panel 41, as shown in Figs. 4 and 5. A shifting crank arm 145 secured to the inner end of the shaft 144 is disposed to engage with its outer end a vertical groove 146 formed in a shifting fork 147 which is slidably mounted for longitudinal shifting movement on the guide rod 139. The forward end of the shifting fork 147 engages an annular groove formed in the hub of the couplet 78 and is selectively movable to effect shifting movement of the gears 80 and 81, constituting the couplet into meshing engagement with the cooperating spindle driving gears 83 and 84, respectively.

In order to obtain the three driving ranges required for the complete series of twenty-four spindle driving speeds available, the range change lever 20 is so positioned that the low range gear 80 meshes with the spindle driving gear 83 during the first sixteen revolutions of the crank 21. For the last eight revolutions of the crank 21, the lever 20 is shifted to effect meshing engagement of the high range gear 81 with the spindle driving gear 84. For positioning the range change lever after it has been turned to shift the gearing, the lever 20, as shown in Figs. 1 and 4, is provided with an operating knob 149 and latching device constituted by a spring pressed latching plunger (not shown) that is adapted to enter locating holes 150 or 151 in the control panel 41 and that provides for securing the lever 21 in a low or high range operating position respectively.

In a similar manner, for retaining the speed selecting crank 21 in a predetermined coordinated position of adjustment with the range change lever 20, the crank 21 likewise is provided with an operating knob 153 and latching device constituted by a spring pressed latching plunger 154 that is adapted to enter a locating hole 155 in a stationary member constituting part of the control panel 41, as shown in Figs. 1 and 4.

The speed indicating device or dial 24 is mounted for rotation in the control panel 41 concentrically with the speed selecting crank 21 and carries a continuous circular indicating scale constituted by speed indicia 156 arranged in approximate geometrical progression. As shown in Fig. 4, the indicating dial 24 has secured to its inner side a ring gear 157 which meshes with a cooperating pinion 158 secured to the outer end of the primary cam operating shaft 93 whereby the speed indicating dial is operatively connected with the speed selecting crank 21 for movement in predetermined coordinated relationship with the gear shifting control cams 92, 112 and 130. The gearing interconnecting the dial 24 with the crank 21 is so proportioned that twenty-four revolutions of the crank are required to effect one complete revolution of the dial. Each turn of the crank 21 effects an incremental advancement of the dial 24 corresponding to one of the twenty-four speed indicia 156 into which the continuous circular indicating scale carried thereby is divided.

For determining the selected spindle operating speed effected by a combined positioning of the range change lever 20 and the speed selecting crank 21, the speed indicating dial 24 is arranged to cooperate with one or another of the diametrically opposed indicating plates 22 or 23 formed on the hub of the lever 20. The range change plate 23 indicating the low range position of the lever 20 is preferably colored to conform to the color of the speed indicia divisions on the dial 24 indicating the lower sixteen spindle operating speeds. The plate 22 indicating the leftwardly shifted or high range position of the range change lever 20 is likewise colored to conform to the divisions on the dial 24 indicating the eight highest spindle operating speeds. With the range change lever 20 positioned as indicated in Fig. 1, the low range speed plate 23 is adapted to cooperate with the first sixteen of the indicia 24 for indicating the sixteen lowest spindle speeds. With the speed change crank 21 adjusted to position one or another of the five indicia (within the sector indicated by the dotted lines 229 and 230), adjacent the low range plate 23, the spindle is rotatable at reduced torque transmitting capacity at one of the lowest five rates of speed.

In order to facilitate the shifting of gears on rotation of the range change lever 20 or the speed selecting crank 21, the control station 32 at the side of the column is provided with an inching control button 159, as well as a spindle start button 180, and a spindle stop button 243, shown in Fig. 1, and which are operative to selectively control the energization of the motor 18 as fully explained in the aforementioned Patent No. 2,736,243.

In order to provide a uniform rate of spindle rotation at any of the speeds available by a coordinated adjustment of the range change lever 20 and the speed selecting crank 21, a heavy flywheel 162 is secured to the rearward end of the spindle 16, as is shown in Fig. 2. The flywheel functions to reduce to a minimum any slight fluctuations of spindle speed which might occur, for example, at the moment of impact as an individual cutting tooth of a cutter (not shown) mounted on the spindle 16 enters a workpiece carried by the table 15 in the performance of a cutting operation.

To properly center and position the flywheel 162 on the spindle 16, the rearward end of the spindle is provided with a slight taper 163 disposed to cooperate with a complementary internal taper formed toward the inner end of a bored hole extending through the flywheel. For securing the flywheel to the spindle, the spindle 16 is provided with a splined end portion 165 disposed to receive a locking plate 166 having a complementary splined opening and secured to the flywheel by means of cap screws 167 and dowels 168. A locking nut 169 is threaded on the rearward end of the spindle 16 in a manner to retain the flywheel in locked engagement therewith.

The knee 13 is supported in any selected position of vertical adjustment by means of an improved elevating mechanism comprising essentially two spaced vertically upstanding parallelly disposed elevating screws (not shown) interposed between the knee 13 and a forwardly extending base section 262 of the column 12 and respectively contained within a pair of telescoping protective housing 263 and 264, as shown in Fig. 1.

To retain the upper surface 392 of the knee in a plane that is at right angles to the front face 293 of the column, Fig. 1, regardless of its vertically adjusted position therealong, and to prevent any deviation in the parallelism of the upper knee surface 392 relative to a predetermined horizontal plane, the elevating screws (not shown) are disposed to be engaged at the same relative height above the column base 262 by a pair of cooperating internally threaded nuts (not shown).

For effecting manual adjustment of the knee 13, the saddle 14 and the table 15 independently of the selectively connectable power driven means, there are provided individually and separately operable manual control means, as shown in Fig. 1. For effecting longitudinal movement of the table 15, a handwheel 380 at the leftward end thereof is selectively connectable to effect rotation of a table screw (not shown) journalled at its opposite ends in a pair of depending end brackets 371 and 372 secured to the opposite ends of the table 15. For effecting cross traversing movement of the saddle 14, that is provided with a dovetailed guideway 395 slidably engaging a complementary guideway formed in the upper face of the knee 13, a handwheel 381 at the front of the knee 13 is selectively connectable to effect manual rotation of a cross traversing shaft (not shown) relative to a cooperating nut (not shown) carried by the knee 13. To effect vertical adjustment of the knee 13 relative to the column 12, a crank 382 journalled at the front of the knee is connectable to effect synchronized manually controlled rotation of the spaced apart elevating screws (not shown) contained within the hollow telescoping housings 263 and 264.

In a modified form of the variable speed transmission mechanism for driving the tool spindle 16, shown in Fig. 3, the range change mechanism C is so arranged as to provide for mounting a flywheel 421 on the spindle 16 immediately within the forward wall of the column 12. A principal advantage afforded by this construction arises from the fact that placing the flywheel 421 as close as possible to the tool retaining end of the spindle 16 reduces to a minimum the deflection caused by torsional stress in the spindle 16 in rotating a tool to perform a cutting operation on a workpiece. To rotate the cutter spindle 16 at a selected speed in a low, intermediate or in a high speed range, the intermediate range changing mechanism B and the range changing mechanism C are coordinately operable on adjustment of the speed selecting lever 21 and the range change lever 20 to transmit power from the coordinately adjustable speed changing device A for rotatably driving the tool spindle 16 at a selected one of twenty-four driving speeds, as hereinbefore explained. The speed selecting lever 21, Fig. 1, is operative to shiftably adjust the speed changing device A, Fig. 3, coordinately with the intermediate range changing mechanism B for transmitting driving power from the input bevel gear 36 to rotate the driving shaft 62, immediately below and parallel to the spindle 16, at a selected one of sixteen driving speeds. The range change lever 20, Fig. 1, is operatively connected to shiftably adjust the range change mechanism C for transmitting driving power from the driving shaft 62 to drive the spindle in a low or a high range selectively. During the first sixteen revolutions of the speed selecting crank 21, Fig. 1, the range change lever 20 is retained in its low range driving position, and for the last eight revolutions of the crank 21, the range change lever 20 is moved to its high range position for driving the tool spindle 16 through its complete range of twenty-four driving speeds.

As shown in Fig. 3, the modified form of the range changing mechanism C comprises a high speed driving helical gear 422 rotatably journalled on the drive shaft 62 and disposed to be in constant meshing engagement with a complementary helical gear 423 splined on the spindle 16 in combination with a low speed driving pinion 424 slidably splined on the drive shaft 62. For driving the tool spindle 16 in the low range, the low range driving pinion 424 is shiftably adjusted to its extreme rightward position on the shaft 62, as shown in Fig. 3, in a manner to meshingly engage a low range gear 425 integrally formed with the flywheel 421 which is splined directly to the spindle 16. For driving the tool spindle 16 in the high range, the low range pinion 424 is shifted leftwardly in manner that the leftward end thereof engages an internal gear 426 formed in the high range pinion 422, thereby locking the pinion to the driving shaft 62 for rotation therewith. Since the high range pinion 422 is of the helical type disposed to be in constant meshing engagement with the complementary helical gear 423 splined to the spindle 16, engagement of the low range pinion 424 with the internal gear 426 formed in the helical pinion 422 will effect transmission of power from the driving shaft 62 to rotate the tool spindle through its high range of operating speeds. To adjust the range changing mechanism C for driving the tool spindle 16 in the high range or in the low range of speed selectively, there is provided on the low range pinion 424 an annular groove disposed to be engaged by a shifter fork 427 operatively connected to be shiftably adjusted by means of the range change lever 20.

From the foregoing explanation of the construction and operation of the preferred embodiment of the invention, it is apparent that there has been provided an improved transmission and control mechanism for a milling machine of the knee and column type that is capable of effecting speed changes throughout an extremely wide range of operation with facility and accuracy.

While the invention has been shown and described as applied to the driving train for operating the tool spindle of a milling machine, it is to be understood that it may be incorporated with equal advantage to drive the work supporting structures or in the power transmisison mechanism for any other movable member of a machine tool.

Although particular structures have been shown and described in considerable detail as exemplary of the manner in which the invention may be practiced, it will be apparent to those skilled in the art to which this invention relates that various modifications of the structures herein shown may be effected without departing from the spirit and scope of the invention as defined in the subjoined claims.

The principles of the invention having now been fully explained in connection with the foregoing description of embodying structure, we hereby claim as our invention:

1. In a variable speed driving mechanism for a milling machine, a tool spindle disposed to be driven at a selected speed throughout a wide selection of high and low speeds, a rotatably journalled shaft disposed in parallelism with said tool spindle, a sleeve journalled on said shaft for independent rotation, range changing means including an element shiftably carried on said shaft disposed to transmit power between said shaft and said tool spindle at a selected one of two driving ratios, an intermediate driving train including a driving member shiftably carried on said shaft disposed to transmit power from said sleeve to drive said shaft at a selected one of two speed ratios, a speed changing device including a plurality of motion transmitters shiftably carried by said sleeve and disposed to drive said sleeve at a selected one of a plurality of driving speeds, a speed control mechanism operatively connected to selectively adjust said speed changing device, a shifting lever connected to be actuated by said speed control mechanism in a manner to effect a shiftable adjustment of said driving member in coordinated relationship with the concomitant adjustment of said speed changing device, a range changer operatively connected to shiftably adjust said range changing means, and a pair of movable indicating plates cooperatively mounted and respectively actuatable on adjusting movement of said speed control mechanism and said range changer to coordinately indicate the selected output speed of said tool spindle.

2. In a milling machine tranmission and control mechanism, a driven member, a plurality of range changing mechanisms connected in series to drive said driven member in either a low, intermediate or high speed range, a speed changing mechanism connected to drive one of said range changing mechanisms at one of a plurality of stepped speeds within any one of said ranges, a power source connected to drive said speed changing mechanism at a predetermined constant speed, a range change lever operatively connected to effect shifting movement of one of said range changing mechanisms, a speed selecting crank operatively connected to shift said speed changing mechanism and the other of said range changing mechanisms in a coordinated manner, a speed indicating dial carrying speed indicia associated with said speed selecting crank in a manner to be turned thereby to a plurality of positions corresponding to the various speed ratios effected by shifting said speed changing and said range changing mechanisms, and a range change plate associated with said range change lever in a manner to be moved thereby into cooperating relationship with said speed indicating dial to indicate the selected speed of said driven member.

3. In a variable speed mechanism for a milling machine, a tool spindle disposed to be driven at a selected speed in a high or a low range, a driving member operatively connected to drive said tool spindle, a gear couplet slidably splined on said driving member to constitute a range changer and being shiftably adjustable to transmit power to drive said tool spindle at one of two selected ratios, a shifting gear including an internal gear slidably splined on said driving member to constitute an intermediate range changer and being shiftably adjustable to drive said driving member at one of two selected ratios, an externally splined sleeve rotatably journalled on said driving member arranged to be driven at one of a plurality of speed rates and constituting a source of driving power for said intermediate range changer, a plurality of shiftable gears and idler gears including a plurality of shiftable gears slidably splined on said sleeve to constitute a speed changing device and being shiftably adjustable to drive said sleeve at a selected one of a plurality of different speeds, a range change lever operatively connected to effect shiftable adjustment of said range changer, a speed selector mechanism operatively connected to effect shiftable adjustment of said speed changing device, a shifting device including a pivotable lever operatively connected to be actuated by said speed selector mechanism for shiftably adjusting said intermediate range changer coordinately with said speed changing device said shifting device being disposed to retain said intermediate range changer in one shiftably adjusted position during one complete series of shifting movements of said speed changing device and to retain said intermediate range changer in its other shiftably adjusted position during two additional complete series of shifting movements of said speed changing device, and a pair of indicating plates respectively associated with said range change lever and said speed changing mechanism being individually movable to coordinately indicate the shiftably adjusted positions of said speed changing device, said intermediate range changer and said range changer.

4. In a variable speed driving and control mechanism for a milling machine, a driven member disposed to be driven at a selected speed throughout a wide selection of driving speeds, a range changer, an intermediate range changer and a speed changing device connected in series to drive said member at a selected speed, a range change lever operatively connected to adjust said range changer, a speed change crank operatively connected to adjust said speed changing device throughout a plurality of repetitive series of shiftable adjustments, a shifting arm operatively connected to adjust said intermediate range changer and being operatively connected to be actuated by said speed change crank, said shifting arm being arranged to retain said intermediate range changer in one of its adjusted positions during one series of shiftable adjustments of said speed changing device and said shifting arm being operable to retain said intermediate range changer in another of its adjusted positions during another series of shiftable adjustments of said speed changing device, and indicating plate associated with said range change lever in a manner to be moved thereby to indicate the adjusted position of said range changer, and a cooperating dial carrying speed indicia markings associated with said speed change crank and disposed to be moved thereby into coordinated relationship with said indicating plate to indicate the selected speed of said driven member.

5. In a variable speed mechanism for a milling machine, a rotatable cutter spindle disposed to be driven throughout a wide selection of high and low speeds, a flywheel having external gear teeth formed on its outer periphery to constitute a low speed drive gear and being secured to said spindle in proximity to the tool retaining end thereof, said flywheel being positioned as close as possible to the tool retaining end of said spindle in order to minimize torsional stress therein whenever said spindle is being rotated, a high speed spindle drive gear having helical gear teeth formed in the outer periphery thereof and being secured to said spindle adjacent to said flywheel, a rotatable driving shaft disposed in parallelism with said spindle, a helical gear journalled on said driving shaft disposed to be in constant meshing engagement with the said high speed spindle drive gear, said helical gear being provided with an internally formed clutching gear, a range changer constituted by a gear slidably splined on said driving shaft and being selectively shiftable thereon into driving engagement with said low speed driving gear or with the internal clutching gear formed in said helical gear respectively in a manner to transmit power from said driving shaft to drive said spindle at a selected one of two driving ratios, an intermediate range changer including a gear slidably splined on said driving shaft in a manner to be adjustable for driving said shaft at a selected speed ratio, an externally splined drive sleeve rotatably journalled on said driving shaft operable to drive said intermediate range changer, a plurality of shiftable gears slidably splined on said sleeve, and a power driven speed changing device disposed to cooperate with the said gears splined on said sleeve, whereby said sleeve may be driven at a selected one of a plurality of speeds and said spindle may be driven at a selected speed in a low, intermediate or high speed range.

6. In a speed changing mechanism, a rotatable tool spindle, a first range change mechanism operatively connected to drive said tool spindle at a low range or a high range respectively, an intermediate range change mechanism connected to drive said first range changer at a low range or a high range respectively, a shiftably adjustable power driven speed changer operatively connected to drive said intermediate range changer at a selected one of eight speed rates, a speed selecting mechanism including a rotatable speed selecting crank operatively connected to effect a continuous sequence of three series of shiftable adjustments of said speed changer and simultaneously therewith to effect a coordinate shiftable adjustment of said intermediate range change mechanism, said speed selecting mechanism being operative to retain said intermediate range change mechanism in its low range position during the first series of shiftable adjustments of said speed changer and to retain said intermediate range change mechanism in its high range driving position during both the second and third series of shiftable adjustments of said speed changer, and a range change shifting mechanism operatively connected to shiftably adjust said first range change mechanism to its low range position during the first two series of shiftable adjustments of said speed changer and to retain said first range change mechanism in its high range position during the third series of shiftable adjustments of said speed changer.

7. In a milling machine, an upstanding hollow column, a tool spindle journalled in said column, a high speed gear and a low speed gear secured to the forward end of said tool spindle, a primary drive shaft journalled in parallel spaced relationship to said tool spindle, a shiftable gear couplet slidably splined to the forward end of said drive shaft, said couplet being shiftably movable into engagement with said high speed gear or with said low speed gear for driving said spindle at a high range or a low range respectively, a drive sleeve rotatably journalled on the central portion of said primary shaft, a slow speed device journalled in spaced relationship to said primary shaft, said slow speed device being connected to be driven by said sleeve, an intermediate range change gear slidably splined on the rearward end of said primary shaft for axial shifting movement, said intermediate range change gear being shiftably movable to be driven by said sleeve or by said slow speed device for driving said primary shaft at a high or a low range of speeds respectively, a shiftably adjustable speed changer operatively connectable to drive said sleeve at a selected one of eight speed rates, a motor connected to drive said speed changer, a shifting mechanism including a rotatable speed selecting crank connected to effect shiftable adjustment of said speed changer through three complete series of speed selecting adjustments and simultaneously therewith being connected to shiftably adjust said intermediate range change gear, said crank being connected to retain said intermediate range change gear in its low range position during the first complete series of shiftable adjustments of said speed changer, said crank being connected to retain said intermediate range change gear in its high range position during the second two series of shiftable adjustments of said speed changer, and a range change mechanism connected to shiftably adjust said shiftable gear couplet to be driven by said slow speed gear during the first two series of shiftable adjustments of said speed changer and to be driven by said high speed gear during the third series of shiftable adjustments of said speed changer.

8. In a machine tool, a column, a tool spindle journalled in said column, a drive shaft journalled in said column in parallel spaced relationship to said tool spindle, a first shiftably adjustable range changer operatively connectable to transmit power from one end of said drive shaft for rotating said spindle at a low or a high speed range, a second shiftably adjustable range changer operatively connectable to drive the opposite end of said drive shaft at a low or at a high speed range, an externally splined sleeve rotatably journalled on the central portion of said drive shaft and being connected to drive said second range changer at a selected one of a plurality of speed rates, a selectively adjustable speed changer including a plurality of shiftable gears slidably splined to said sleeve for individual shifting movement, said speed changer being selectively adjustable for driving said sleeve at a plurality of speed rates, a speed selector including a rotatable crank connected to effect a continuous sequence of three series of shiftable adjustments of said speed changer, said speed selector being connected to retain said second range changer in its low range position during the first series of shiftable adjustments of said speed changer, said speed selector being connected to retain said second range changer in its high range position during the last two series of shiftable adjustments of said speed changer, and a range change selector connected to shiftably adjust said first range changer to its low range position during the first two series of shiftable adjustments of said speed changer, said range change selector being operative to shiftably adjust said first range changer to its high range position during the third series of shiftable adjustments of said speed changer.

9. In a machine tool, a column, a tool spindle journalled in said column, a primary driving shaft journalled in said column in parallel spaced relationship to said tool spindle, a power driven speed changing mechanism carried in said column, a sleeve rotatably journalled to rotate on the central portion of said primary driving shaft, said sleeve being connected to be driven at a selected speed rate by said speed changing mechanism, an intermediate range changer including a shiftable gear slidably splined toward one end of said primary driving shaft, said intermediate range changer being operatively connectable to transmit power from said sleeve for rotatably driving said primary shaft at a selected range of speeds, and a second range changer including a shiftable gear slidably splined to the opposite end of said primary driving shaft, said second range changer being selectively connectable to transmit driving power from said primary shaft for driving said tool spindle at a selected range of speeds.

10. In a machine tool, a column, a driven member journalled in said column, a driving member journalled in said column, a sleeve journalled to rotate on said driving member, a shiftably adjustable power driven speed changer connected to drive said sleeve at a selected one of eight speed rates, a first range changer operatively connected to transmit driving power from said sleeve to rotate said driving member at a selected one of two speed ranges, a second range changer connected to transmit power from said driving member at a selected one of two speed ranges, a speed selecting mechanism connected to effect a coordinated shiftable adjustment of said speed changer and said first range changer, and a range changing mechanism connected to effect a selective shiftable adjustment of said second range changer.

11. In a variable speed transmission mechanism, a rotatably journalled driven member, a rotatable driving member journalled in spaced apart relationship to said driven member, a first shiftable range changer operatively connectable to transmit power from one end of said driving member to rotate said driven member at a selected one of two speed ranges, a second shiftable range changer operatively connectable to the opposite end of said driving member for rotating said driving member at a selected one of two speed ranges, an externally splined sleeve journalled to rotate about the central portion of said driving member intermediately said range changers, a speed changer including a pair of shiftable gears slidably splined to said sleeve for axial shifting movement, said speed changer being connectable to transmit power for rotating said sleeve at one of a plurality of eight different speed rates, a motor connected to drive said speed changer, a shifting mechanism operatively connected to effect a coordinated shiftable adjustment of said speed changer and said second range changer, and a second shifting mechanism connected to effect selective shiftable adjustment of said first range changer.

References Cited in the file of this patent

UNITED STATES PATENTS

| | | |
|---|---|---|
| 2,008,983 | Kearney | July 23, 1935 |
| 2,110,173 | Pohl et al. | Nov. 8, 1938 |
| 2,164,884 | Nenninger et al. | July 4, 1939 |
| 2,214,805 | Baker et al. | Sept. 17, 1940 |
| 2,303,270 | Grover | Nov. 24, 1942 |
| 2,338,121 | Le Blond et al. | Jan. 4, 1944 |
| 2,349,595 | Marlellotti | May 23, 1944 |
| 2,505,221 | Tomlinson | Apr. 25, 1950 |
| 2,597,716 | Eserkaln | May 20, 1952 |
| 2,706,544 | Schuman | Apr. 19, 1955 |